United States Patent Office 2,909,467
Patented Oct. 20, 1959

2,909,467

3-(d-ALPHA-METHYLPHENETHYL)-5-METHYL-1,3-OXAZOLIDINE-2,4-DIONE

Seymour L. Shapiro, Hastings on Hudson, Louis Freedman, Bronxville, and Ira M. Rose, Yonkers, N.Y., assignors to U.S. Vitamin & Pharmaceutical Corporation, a corporation of Delaware No Drawing. Application July 9, 1958
Serial No. 747,347

2 Claims. (Cl. 167—65)

This invention is concerned with oxazolidinediones, and more specifically with oxazolidinediones with novel and unexpected therapeutic properties. More specifically it is concerned with 3-(d-α-methylphenethyl)-5-methyl-oxazolidine-2,4-dione and analogs of this substance of the following formula

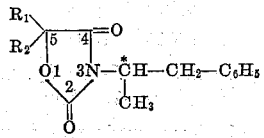

wherein $R_1$ and $R_2$ are varied as hydrogen, alkyl and aryl. The carbon atom marked with the asterisk is asymmetric, and accordingly can exist as the d, l or dl form. In turn, when $R_1$ is different from $R_2$, the carbon atom at position 5 is also asymmetric and can yield isomeric forms.

We have now found that by critical selection of the $R_1$ and $R_2$ groups, and by use of the 3-substituent having the d-α-methylphenethyl configuration that oxazolidinediones of novel, unanticipated and useful pharmacological characteristics are so obtained. In particular, we have found that the compound wherein $R_1$=hydrogen, $R_2$=methyl, and wherein the 3-substituent is d-α-methyl-phenethyl affords a substance which has a profound stimulatory effect on the central nervous system, is without effect on the blood pressure, and even at high dosage levels does not induce the convulsive pattern characteristic of Benzedrine. Therapeutic application of such products is indicated in psychotics and neurotics, as well as in obese and mentally depressed patients.

This excitant effect is all the more unexpected since oxazolidinediones described in the prior art have been represented as having therapeutic properties which might be generally classified as depressants of the central nervous system and have been suggested for use as anti-convulsants, analgesics and sedative agents.

In turn, the novel oxazolidinedione central nervous system stimulants of this invention show unique and desirable properties in their absence of cardiovascular side effects and absence of convulsant effects. Currently used analeptic drugs such as Benzedrine have noted cardiovascular side effects and induce convulsions at relatively low dosage levels.

It is thus an object of this invention to characterize and select oxazolidinediones which are useful and safe analeptic agents.

It is further an object of this invention to prepare such oxazolidinediones, and to process them in dosage unit form as therapeutic agents for oral as well as parenteral use.

Other objects will become apparent from a consideration of the following specification and claims.

The criticality of structure which defines the compounds meeting the objectives of this invention is evident wherein a variety of closely related substances have been synthesized and described in the examples below, and examined for analeptic activity in the absence of cardiovascular side effects. The pharmacological observations have been tabulated in Table Ia and Table Ib and compared with the familiar analeptic drug Benzedrine.

TABLE Ia

*Pharmacological properties of 3-(α-methylphenethyl)-5-substituted-1,3-oxazolidine-2,4-diones*

| $R_1$ | $R_2$ | Optical Form of $CH(CH_3)CH_2\Phi$ | $LD_{min.}$ mg./kg. | CNS percent Increase | Dosage, s.c., mg./kg. | BP |
|---|---|---|---|---|---|---|
| H | H | "d" | 300 | 88 | 10 | 0. |
| $CH_3$ | H | "d" | 300 | 605 | 20 | 0. |
| $CH_3$ | H | "d" | | 202 | 20 (oral) | |
| $CH_3$ | H | "dl" | 750 | 384 | 100 | hypertension |
| $CH_3$ | H | "l" | 500 | 0 | 100 | Do. |
| $CH_3$ | $CH_3$ | "d" | 200 | −19 | 10 | 0. |
| $C_4H_9CH(C_2H_5)-$ | H | "d" | 200 | 0 | 10 | hypertension |
| Benzedrine | | | 75 | 534 | 10 | Do. |

The individual compounds were evaluated for increase in central nervous system (CNS) activity in rats in activity cages. The excitary action is registered on a counter and kymograph responsive to motion. Each of the compounds was tested at the indicated dosage level subcutaneously (s.c.) and compared with six rats serving as controls during intervals from 5 p.m. to 9 a.m. the next day. The activity is expressed by the formula $$CNS\% \text{ Increase in Activity} = \frac{\text{Activity Test Group}}{\text{Activity Control Group}} \times 100.$$

As a comparison, the familiar drug Benzedrine was used. The $LD_{min.}$ is the minimum lethal dose as established in mice. BP is the blood pressure response as established in anesthetized dogs.

TABLE Ib

*Influence on convulsant threshold*

[Number of animals showing varying degree of convulsions.]

| Compound | Dosage, s.c., mg./kg. | Convulsant Response | | | | |
|---|---|---|---|---|---|---|
| | | 0 | 1+ | 2+ | 3+ | 4+ |
| A | 200 | 5 | | | | 1 |
| | 300 | 6 | | | | |
| | 500 | 4 | | | 1 | 1 |
| B | 25 | | 3 | 1 | 2 | |
| | 50 | | 1 | | 1 | 4 (3 died). |
| | 100 | | | | | 6 (6 died). |

In this test the drug was administered to six mice at each of the dosage levels shown. Drug A was 3-(d-α-methylphenethyl)-5-methyl-oxazolidinedione. Drug B was Benzedrine. Fifteen minutes after administration of the drug, a sub-convulsive dose of Metrazole was administered, 50 mg./kg. s.c. This dose does not produce convulsions when administered to mice. However, in the presence of drugs which lower the convulsant threshold, convulsions of increasing severity ranging from 0 (no convulsions) to 1+ (mild) to 4+ (extreme) are noted. The responses obtained for all the tested mice have been indicated in the table and it is evident that Compound A, even at very high doses, did not raise the convulsant level in the manner shown by Benzedrine.

It will be noted that the criteria of (a) potent central nervous system stimulatory effect, (b) potent central nervous system stimulatory effect when administered orally, (c) absence of cardiovascular side effects, and (d) absence of convulsive effect, are confined principally to 3-(d - α - methylphenethyl) - 5- methyl - 1,3 - oxazolidine-2,4-dione.

This compound has been made in two ways. Reaction of a lower alkyl lactate such as ethyl lactate with d-α-methylphenethylamine yielded the corresponding hydroxyamide. Upon solution of this amide in a lower dialkylcarbonate such as diethylcarbonate, and treatment with catalytic quantities of sodium ethoxide, or other suitable basic catalyst such as potassium or other alkali metal alkoxide, or benzyl trimethyl ammonium methoxide, after reflux and removal of the formed ethanol, there is obtained the required oxazolidinedione.

Alternatively, the amide need not be the initial reactant, and the required compound may be obtained by mixing substantially equimolar quantities of the d-α-methylphenethylamine, a lower alkyl lactate in a lower dialkyl carbonate, and upon treatment with alkaline catalysts as described above, the required oxazolidinedione is obtained. The exact mechanism of this three-reactant condensation has not been completely elucidated. However, the equation below indicates a possible route to the final product.

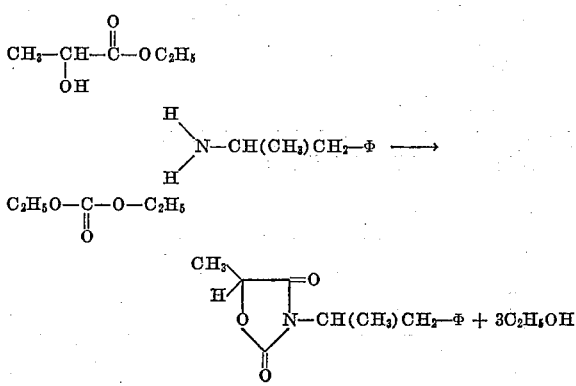

The examples below are given for purposes of illustration, it being understood that the scope of the invention is shown by the claims hereinafter set forth. Examples are also given for the preparation of compounds which have been prepared and examined to demonstrate the criticality of the structural requirements for the preferred embodiment of this invention.

The various hydroxy amides which have been utilized as initial reactants and which have not previously been described in the literature, were synthesized by reaction of the α-hydroxy ester with d-α-methylphenethylamine, and have these constants:

N-(d-α-methylphenethyl)-glycolamide, B.P. 159° at 0.04 mm.

N-(d-α-methylphenethyl)-lactamide, M.P. 52–53°.

N - (d - α - methylphenethyl) - α - hydroxyisobutyramide, M.P. 54–57°.

EXAMPLE 1

3-(d-α-methylphenethyl)-5-methyl-1,3-oxazolidine-2,4-dione

A solution of N-(d-α- methylphenethyl)lactamide, 10.36 g. (0.05 mole), in 25 ml. of diethylcarbonate was treated with a solution of 0.1 g. of sodium in 2 ml. of ethanol and the reaction mixture heated under reflux for one hour. After removal of the formed alcohol and excess diethylcarbonate, the product distilled at 103° at 0.05 mm. (bath 157°), there being obtained 9.9 g. (84%). The oily material crystallized to a soft solid on standing, and was recrystallized from ethyl acetate-hexane mixture, to yield crystals, M.P. 66–70.5°.

Analysis.—Calcd. for $C_{13}H_{15}NO_3$: C, 66.9; H, 6.5; N, 6.0. Found: C, 67.2; H, 6.3; N, 6.0.

EXAMPLE 2

3-(d-α-methylphenethyl)-1,3-oxazolidine-2,4-dione

Prepared in a manner similar to Example 1, using N-(d-α-methylphenethyl)-glycolamide as the reactant amide. There was obtained 27.4% yield of product boiling at 107–127° at 0.1 mm. (bath 209–232°).

Analysis.—Calcd. for $C_{12}H_{13}NO_3$. C, 65.7; H, 6.0; N, 6.7. Found: C, 66.4; H, 6.7; N, 6.1.

EXAMPLE 3

3-(d-α-methylphenethyl)-5,5-dimethyl-1,3-oxazolidine-2,4-dione

Prepared in a manner similar to Example 1, using N-(d-α-methylphenethyl)-α-hydroxyisobutyramide. In this instance, upon completion of the reflux period, and standing and cooling, the product (87.3%) crystallized from the reaction mixture and was separated by filtration. On recrystallization from hexane the pure product, M.P. 108–109° was obtained in 73% yield.

Analysis.—Calcd. for $C_{14}H_{17}NO_3$: C, 68.0; H, 6.9; N, 5.7. Found: C, 68.6; H, 7.3; N, 5.7.

EXAMPLE 4

3-(d-α-methylphenethyl)-5-(1-ethyl-pentyl)-1,3-oxazolidine-2,4-dione

The requisite α-hydroxyamide was prepared by treatment of 2-hydroxy-3-ethylheptanoic acid with an equivalent quantity of d-α-methylphenethylamine in xylene with reflux for a 120-hour period. After removal of water and xylene, the N-(d-α-methylphenethyl)-2-hydroxy-3-ethylheptanoamide boiled at 160° at 0.03 mm. and was obtained in 63% yield.

Using this amide as the reactant and following the procedure of Example 1, the product was obtained in 80% yield, B.P. 134–139° at 0.005 mm. (bath 210°).

Analysis.—Calcd. for $C_{17}H_{27}NO_3$: C, 71.9; H, 8.6. Found: C, 72.3; H, 8.8.

EXAMPLE 5

3-(d-α-methylphenethyl)-5-methyl-1,3-oxazolidione-2,4-dione

While, as has been shown in Example 1, the product is readily prepared from the α-hydroxyamide, the required material can be processed directly from the required amine, ethyl lactate and diethyl carbonate in the following manner:

A mixture of 13.5 g. (0.1 mole) of d-α-methylphenethylamine and 11.8 g. (0.1 mole) of ethyl lactate and 25 ml. of ethyl carbonate was warmed to 80°, and then a solution of sodium ethoxide added (0.1 g. Na in 2 ml. ethanol) and the solution refluxed. The initial internal reflux temperature was 110° and after 1 hour the internal temperature was 105°. The formed alcohol (11.5 ml.) was removed and another addition of catalyst (0.1 g. Na in 2 ml. ethanol) made.

The reaction mixture upon reflux had an initial internal temperature of 145° and after 1 hour, the internal temperature had been lowered to 105° by the formed alcohol. This was removed until the vapor temperature reached 120°, 7.5 ml. of ethanol being collected.

The reaction mixture was filtered and distilled. After a small forerun, the title product distilled at 108–116° at 0.01 mm. (bath 165°). There was obtained 17.15 g. (73.5%). The liquid product (17 g.) was dissolved in 100 ml. of hexane (carbon and filtered) and 5 ml. of ethyl acetate was added to keep the solution clear while cooling to 10° C. Further cooling in an ice bath, with addition of 2 ml. of ethyl acetate to prevent oiling, on standing several hours yielded 4.3 g. of crystalline product, M.P. 64–74°. Additional crystallization from hexane-ethyl acetate gave M.P. 66–70.5°.

*Analysis.*—Calcd. for $C_{13}H_{15}NO_3$: C, 66.9; H, 6.5; N, 6.0. Found: C, 67.2; H, 6.3; N, 6.0.

EXAMPLE 6

*3 - ("l" - α - methylphenethyl) - 5 - methyl - 1,3 - oxazolidine-2,4-dione*

This was processed in a manner similar to Example 5, substituting levo-rotary "l"-α-methylphenethylamine as the reactant amine. The product was obtained as a viscous liquid, B.P. 85–90° at 0.03 mm. (bath 140–150°) in 80% yield.

*Analysis.*—Calcd. for $C_{13}H_{15}NO_3$: C, 66.9; H, 6.5; N, 6.0. Found: C, 67.4; H, 6.8; N, 6.0.

EXAMPLE 7

*3 - (dl - α - methylphenethyl) - 5 - methyl - 1,3 - oxazolidine-2,4-dione*

This was processed in a manner similar to Example 5, substituting dl-α-methylphenethylamine as the reactant amine. The product was obtained as a viscous liquid, B.P. 96–104° at 0.05 mm. (bath 145–155°) in 82% yield.

*Analysis.*—Calcd. for $C_{13}H_{15}NO_3$: C, 66.9; H, 6.5; N, 6.0. Found: C, 67.6; H, 6.9; N, 5.8.

EXAMPLE 8

*3 - (d - α - methylphenethyl) - 5 - phenyl - 1,3 - oxazolidine-2,4-dione*

This was prepared in a manner similar to Example 5, using ethyl mandelate as the reactant ester. Upon completion of the reflux period, the product crystallized from the cooled reaction mixture, and upon recrystallization from ethyl acetate-hexane was obtained in 40% yield, M.P. 120–121°.

EXAMPLE 9

*3 - (d - α - methylphenethyl) - 5 - ("l" - methyl) - 1,3 - oxazolidine-2,4-dione*

This was prepared in a manner similar to Example 5, using L-ethyl lactate as the reactant ester. Whereas, in the other examples above using ethyl lactate in the dl form, there is obtained the optical isomer mixture reflecting the mixture of D and L forms resulting in position 5 of the oxazolidinedione ring. In the instance of this example, only one form is obtained by reason of starting with the optically active L-ethyl lactate. The assignment of the L-form to the 5-methyl group is intended only in terms of reference of its origin from L-ethyl lactate.

The product was obtained in 73% yield as a viscous liquid, B.P. 104–108° at 0.1 mm. (bath 165–168°). On standing, it crystallized and after recrystallization from hexane, melted at 68–70°.

In a similar fashion, using equimolar quantities of ethyl carbonate and d-α-methylphenethylamine in an excess of ethyl lactate, the product was obtained, M.P. 67–74°.

While the optical form of the 3-α-methylphenethyl group is critical and is required to be in the "d" form as derived from d-α-methylphenethylamine, the existence of $R_1$ as $CH_3$, and $R_2$ as H as substituents on the 5-carbon of the oxazolidinedione ring introduces another asymmetric carbon at this point.

There exist, therefore, three forms of the preferred compounds of this invention, as shown below indicating the variability of optical forms about the 5-position.

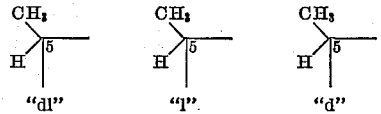

For the purposes of this invention, these forms reflecting asymmetry at the 5-carbon are all considered equivalent.

The new compounds may be used as medicaments, for example, in the form of pharmaceutical preparations which contain the compounds in admixture with a pharmaceutical organic or inorganic solid or liquid carrier suitable for oral or parenteral administration. For making these preparations there are used substances which do not react with the new compound, for example, water, gelatine, lactose, starches, magnesium stearate, talc, vegetable oils, benzyl alcohols, gums, polyalkylene glycols, petroleum jelly, cholesterol or another carrier known for medicaments.

The pharmaceutical preparations may be made up, for example, as tablets or in liquid form as solutions, suspensions or emulsions. If desired, they may be sterilized and/or may contain auxiliary substances, such as preserving agents, stabilizing agents, wetting agents or emulsifying agents, salts for regulating the osmotic pressure, or buffers. They may also contain other therapeutically active substances. The preparations are made up by the usual methods.

In particular, the new compounds may be administered as 5–50 mg. tablets or capsules incorporated in suitable pharmaceutical carriers. The amount of the active ingredient used will vary dependent upon the severity of the condition and the individual patient responsiveness to the therapy. These compounds are useful particularly in the treatment of mentally depressed states, and for appetite control in the obese patient.

It is to be understood that it is intended to cover all changes and modifications of the examples herein chosen for the purpose of illustration which do not constitute departures from the spirit and scope of the invention.

We claim:

1. The compound 3-(d-α-methylphenethyl)-5-methyl-1,3-oxazolidine-2,4-dione.

2. A composition of matter consisting of, at least 5 mg. of 3-(d-α-methylphenethyl)-5-methyl-1,3-oxazolidine-2,4-dione, and a solid pharmaceutical carrier in dosage unit form.

References Cited in the file of this patent

UNITED STATES PATENTS 2,559,011     Davies et al.     July 3, 1951